US008973632B2

(12) United States Patent
Mancini

(10) Patent No.: US 8,973,632 B2
(45) Date of Patent: Mar. 10, 2015

(54) WHEEL FOR VEHICLES

(75) Inventor: Gianni Mancini, Milan (IT)

(73) Assignee: Pirelli Tyre S.p.A., Milan (IT)

(*) Notice: Subject to any disclaimer, the term of this patent is extended or adjusted under 35 U.S.C. 154(b) by 827 days.

(21) Appl. No.: 13/141,243

(22) PCT Filed: Dec. 23, 2008

(86) PCT No.: PCT/IT2008/000790
§ 371 (c)(1),
(2), (4) Date: Nov. 16, 2011

(87) PCT Pub. No.: WO2010/073273
PCT Pub. Date: Jul. 1, 2010

(65) Prior Publication Data
US 2012/0067496 A1  Mar. 22, 2012

(51) Int. Cl.
*B60B 21/10* (2006.01)
*B60C 15/02* (2006.01)
*B60C 15/024* (2006.01)

(52) U.S. Cl.
CPC ............ *B60C 15/024* (2013.01); *B60B 21/102* (2013.01)
USPC ......................... 152/379.5; 152/384; 152/544

(58) Field of Classification Search
CPC .... B60B 21/10; B60B 21/102; B60B 21/104; B60B 21/108; B60C 15/02; B60C 15/024; B60C 15/0226
USPC ................... 152/379.3, 379.5, 384, 544, 539
See application file for complete search history.

(56) References Cited

U.S. PATENT DOCUMENTS

| 512,917 | A | * | 1/1894 | Stead ............................. 152/384 |
| 1,396,515 | A | * | 11/1921 | McClevey ...................... 152/384 |
| 3,130,965 | A | * | 4/1964 | Niclas .......................... 267/64.27 |
| 4,015,652 | A | * | 4/1977 | Harris ......................... 152/379.3 |
| 4,241,775 | A | * | 12/1980 | Jackson ........................ 152/454 |
| 4,325,422 | A | * | 4/1982 | Corner et al. ............... 152/209.1 |
| 4,561,481 | A | * | 12/1985 | Kawauchi et al. ......... 152/379.3 |

(Continued)

FOREIGN PATENT DOCUMENTS

DE    32 36 610 A1    4/1984
EP    0 328 873 A2    1/1989

(Continued)

OTHER PUBLICATIONS

International Search Report from the European Patent Office for International Application No. PCT/IT2008/000790 (Mail date Aug. 20, 2009).

*Primary Examiner* — Jason Bellinger
(74) *Attorney, Agent, or Firm* — Finnegan, Henderson, Farabow, Garrett & Dunner, L.L.P.

(57) ABSTRACT

A wheel including a tire and a rim wherein the tire includes: a pair of beads, each of the beads being provided with a base, wherein the rim includes a pair of axially outer flanges defining respective bead housing seats, each of the bead housing seats including a base portion, and wherein the base of at least one of the beads and the base portion of the respective bead housing seat are mutually coupled by means of at least one mechanical coupling element, wherein the mechanical coupling element is provided with parts and has a length greater than its width, the length being lower than the circumference of the tire measured at the base of the bead and the width being lower than the axial width of the base of the bead and of the base portion of the respective bead housing seat.

63 Claims, 7 Drawing Sheets

(56) References Cited

U.S. PATENT DOCUMENTS

| | | | |
|---|---|---|---|
| 4,967,822 A | 11/1990 | Frerichs et al. | |
| 6,929,046 B1 * | 8/2005 | Fontaine et al. | 152/539 |
| 2003/0098109 A1 | 5/2003 | Bouvier et al. | |
| 2010/0269970 A1 * | 10/2010 | Mani et al. | 152/544 |

FOREIGN PATENT DOCUMENTS

| | | |
|---|---|---|
| GB | 2 011 324 A | 7/1979 |
| JP | 2002-211215 | 7/2002 |
| WO | WO-01/25030 A1 | 4/2001 |
| WO | WO-01/43993 A1 | 6/2001 |

* cited by examiner

WHEEL FOR VEHICLES

CROSS REFERENCE TO RELATED APPLICATION

This application is a national phase application based on PCT/IT2008/000790, filed Dec. 23, 2008, the content of which is incorporated herein by reference.

BACKGROUND OF THE INVENTION

In a general aspect thereof the present invention relates to a wheel for vehicles.

More particularly, the invention relates to a wheel for vehicles which has a preferred, although non-exclusive use, both on high or very high performance cars, so-called HP (High Performance) or UHP (Ultra High Performance) and on heavy vehicles adapted, for example, to cover long travels in motorways or for heavy uses.

As is known, in a wheel for vehicles, whatever its final application, the tyre is coupled to the rim by means of the interaction between its radially inner end portions, the so-called beads, and the rim itself.

More particularly, the rim comprises in the tyre coupling zone a pair of axially outer flanges extending at least in part along a radial direction and delimiting respective bead housing seats circumferentially extending at an axially inner position with respect to the flanges. These bead housing seats are provided in turn with a base portion and a side portion adapted to cooperate in an abutting relationship with the base and, respectively, with a side portion of the respective bead.

In the case of tyres for a high (HP) or a very high (UHP) performance car, including sporting uses, or in the case of tyres subjected to very high axial and radial loads, as in the case of tyres for heavy vehicles, problems often arise due to the interaction between the rim and the tyre and particularly due to the relative movement between the two elements. Due to very high circumferential and transversal stresses, in fact, tyre movements can occur during use both along a circumferential direction and along an axial direction with respect to the respective rim on which the tyre is mounted, giving rise to a phenomenon known in the art with the term of "bead setting".

In the case, for example, of high driving torques suddenly delivered in acceleration, it may occur that the tyre tends to slide with respect to the rim with a relative rotation along the circumferential direction which is not normally balanced by an identical rotation of the other tyre arranged on the same axle, which relative rotation may impart a rather dangerous drift movement to the vehicle, as it can be sudden and thus not very controllable.

On the other hand, in the case of severe and repeated transversal accelerations of the vehicle, typically related to curves covered at high speed, undesired axial movements of the tyre bead with respect to its housing seat formed in the rim on which the bead was installed during mounting may gradually arise.

The same undesired effect can be produced not only by a strong transversal acceleration, but also by a high transfer of transversal load, such as for example in the case of heavy vehicles.

These movements along the axial direction cause a geometric configuration at the interface between the tyre and the rim which is different from the design one, with a consequent irregular transmission of forces between the wheel and the vehicle and an increasingly deteriorated vehicle behaviour, particularly as far as lateral stability and handling are concerned.

DEFINITIONS

In the following description and in the subsequent claims, the term "bead", is used to indicate the radially inner end portion of the tyre comprising at least one annular reinforcing element, generally indicated in turn with the term "bead core", optionally a filler and/or other reinforcing elements, and shaped in such a manner as to be able to be mounted on the rim.

In the following description and in the subsequent claims, the term: base portion of the bead housing seat, is used to indicate that portion of the rim in contact with the base of the bead of the tyre once mounting has been completed.

In the following description and in the subsequent claims, the terms: "axial" and: "axially", are used to indicate entities measured along a direction parallel to the rotation axis of the tyre, in a plane including the same rotation axis of the tyre.

In the following description and in the subsequent claims, moreover, the terms: "circumferential" and: "circumferentially", are used to indicate entities measured along the development of the tyre parallel to the equatorial plane thereof and perpendicularly to the axial direction.

In the following description and in the subsequent claims, the terms: "radial" and: "radially", are used to indicate entities measured along a direction perpendicular to the rotation axis of the tyre in a plane including the same rotation axis of the tyre.

In the following description and in the subsequent claims, the term: mid-section of the mechanical coupling element or of any one part thereof, is used to indicate the section identified by a transversal centre plane of the element or part thereof.

In the following description and in the subsequent claims, the geometric entities measured with reference to the base of the bead are intended to be measured at a circumferential centre line of said base.

In the following description and in the subsequent claims, the geometric entities measured with reference to the base portion of the bead housing seat are intended to be measured at a circumferential centre line of said base portion.

In the following description and in the subsequent claims, the term: pitch, is used to indicate the distance, measured along the circumferential development of the tyre or of the rim, between corresponding portions of several elements of the tyre or rim which are periodically repeated for a finite number "n" of times over the entire circumferential development thereof.

In the following description and in the subsequent claims, the term: tongue, is used to indicate any element having a substantially prismatic body, optionally provided with protrusions, and having a prevailing dimension extending along the circumferential direction.

In the following description and in the subsequent claims, the term: tongue seat, is used to indicate any cavity having a substantially prismatic shape, optionally provided with recesses, and having a prevailing dimension extending along the circumferential direction.

For the purposes of the present description and of the claims that follow, finally, all numbers expressing amounts, quantities, percentages, and so forth, are to be understood as being preceded in all instances by the term "about" except where otherwise indicated. Also, all ranges of numerical entities, include all the possible combinations of the maximum and minimum numerical values and all the possible intermediate ranges therein, in addition to those specifically indicated hereinbelow.

RELATED ART

In order to remedy the problem of possible relative movements along the circumferential direction between the tyre and the rim, it was proposed, as described for example in International patent application WO 01/25030, to provide respective knurls oriented along the axial direction and complementary to each other on at least part of the outer surface of the beads and on at least a corresponding part of the outer surface of the respective bead housing seats formed in the rim.

According to the application WO 01/25030, these complementary knurls engage with each other and increase the resistance to the relative movements along a circumferential direction between the tyre and the rim.

In order to remedy the problem of possible relative movements along the axial direction between the tyre and the rim, and particularly in order to reduce the risk that the bead can be displaced out of its own housing seat in run flat conditions, it was proposed—as described for example in International patent application WO 01/43993—to form in the base of the beads either a plurality of circular cavities having lenticular section and pitchwise spaced apart from each other along the entire circumferential development of the beads, or alternatively, a continuous toroidal groove extending along the entire circumferential development of the beads.

According to this document, the aforementioned multiple cavities or single toroidal cavity would contribute to reduce the risk in run flat conditions of a displacement of the bead out of its own housing seat along the axial direction thanks to a sort of "suction effect" due to the partial vacuum conditions which are established within the cavity or cavities during the mounting step and deriving from the deformation of the rubber which forms the beads.

SUMMARY OF THE INVENTION

The Applicant has verified that the engagement configuration between bead portions of the tyre and portions of the respective housing seat defined in the rim described in WO 01/25030 allows to remedy only in part the problem of the relative movements between the tyre and the rim, since it seeks to increase the resistance to the relative movements along the circumferential direction between the tyre and the rim, but leaves the problem of relative movements along the axial direction entirely unresolved.

The Applicant has also observed that the use on tyre and rim of complementary knurls oriented along the axial direction is not very practical from the mounting standpoint, due to the difficulties of precisely engaging the knurls with each other. The applicant also observed that the rubber which constitutes the tyre can be deformed during mounting, so that it is possible that a defective engagement between the knurls can allow an air escape along the axial direction, with a consequent and totally undesired pressure loss phenomenon over time.

Finally, the Applicant verified that the knurled configuration provided on at least part of the outer surface of the beads is difficult to obtain in a precise manner during the moulding and vulcanization operations of the tyre, with a possible worsening of the problems related to a poor air seal connected to a defective engagement with the complementary knurls formed in the rim.

The Applicant then observed that the tyre structure described in application WO 01/43993 allows to remedy the problem of possible relative movements along the axial direction between the tyre and the rim only in very particular conditions (run flat conditions), but leaves entirely unresolved the problem of relative movements along the axial direction in the case of tyres for heavy vehicles with very high axial and radial loads and/or along the circumferential direction in the case of car tyres with high or very high performances after severe accelerations or decelerations.

The Applicant has thus perceived the possibility to attain considerable improvements in terms of containment of the phenomenon of tyre movement with respect to the respective mounting rim, both along the circumferential direction and along the axial direction, by providing at least one bead of the tyre and its housing seat on the rim with a mechanical coupling having suitable geometric characteristics.

More precisely, the Applicant has found that thanks to the provision of at least one mechanical coupling element arranged at the interface between at least one of the beads of the tyre and the respective housing seat defined in the rim, and having parts cooperating in abutting relationship with each other along a circumferential and along a transversal direction, and a particular and specific geometric configuration extended along the circumferential direction, the tyre and the relative mounting rim are coupled in an extremely effective manner, resistant to the forces developed in use along a transversal and/or circumferential direction, without having problems of manufacturing, of mounting and of air leakage.

More particularly, according to a first aspect, the present invention relates to a wheel for vehicles comprising a tyre and a rim,
wherein the tyre comprises:
    a carcass structure including a central crown portion and two sidewalls terminating in a pair of beads, each of said beads being provided with a base adapted to cooperate in abutting relationship with the rim;
    a belt structure, coaxially associated to the carcass structure;
    a tread band coaxially extending around the belt structure;
wherein the rim comprises a pair of axially outer flanges extending at least in part along a radial direction and delimiting respective bead housing seats circumferentially extending at an axially inner position with respect to said flanges, each of said bead housing seats comprising a base portion adapted to cooperate in abutting relationship with the base of the respective bead;
wherein the base of at least one of said beads and the base portion of the respective bead housing seat are mutually coupled by means of at least one mechanical coupling element arranged at an interface between the base of the bead and said base portion of said bead housing seat; and
wherein said at least one mechanical coupling element is provided with parts cooperating in abutting relationship along a circumferential and along a transversal direction and has a length measured along the circumferential direction that is greater than its width measured along the axial direction; said length measured along the circumferential direction being lower than the circumference of the tyre measured at the base of said at least one bead and said width measured along the axial direction being lower than the axial width of the base of said at least one bead and of the base portion of the respective bead housing seat.

The applicant believes that thanks to the provision of at least one mechanical coupling element having the aforementioned geometric characteristics, with parts cooperating in abutting relationship at an interface between the base of the bead and the base portion of the respective bead housing seat formed in the rim, it becomes advantageously possible not only to effectively counteract the movement phenomena of the tyre with respect to the rim both along the circumferential direction and along the axial direction, but also to achieve this technical effect while ensuring the desired air seal in any use condition of the tyre.

Thanks to the particular structure and geometric configuration of the aforementioned at least one mechanical coupling element, extending along the circumferential direction and having at the same time a width measured along the axial direction lower than the axial width of the base of said at least one bead, in fact, the mechanical coupling element designed to prevent or at least reduce to substantially negligible values the relative movements between the tyre and the rim, both along the circumferential direction and along the axial direction, is axially flanked, preferably entirely surrounded, by the elastomeric material which constitutes the beads of the tyre, material that acts—during tyre use—as a seal preventing air leakage.

Thanks to the particular structure and geometric configuration of the aforementioned at least one mechanical coupling element, moreover, the mounting operations of the tyre on the rim are advantageously facilitated, and the manufacturing operations both of the tyre and of the rim are advantageously simplified.

According to a second aspect thereof, the present invention relates to a tyre for vehicles comprising:
 a carcass structure including a central crown portion and two sidewalls terminating in a pair of beads, each of said beads being provided with a base adapted to cooperate in abutting relationship with a mounting rim;
 a belt structure, coaxially associated to the carcass structure;
 a tread band coaxially extending around the belt structure;
wherein the base of at least one of said beads comprises at least one tongue seat having a length measured along the circumferential direction greater than its width measured along the axial direction;
said length measured along the circumferential direction being lower than the circumference of the tyre measured at the base of said at least one bead and said width measured along the axial direction being lower than the axial width of the base of said at least one bead.

According to a third aspect thereof, the present invention relates to a tyre for vehicles, comprising:
 a carcass structure including a central crown portion and two sidewalls terminating in a pair of beads, each of said beads being provided with a base adapted to cooperate in abutting relationship with a mounting rim;
 a belt structure, coaxially associated to the carcass structure;
 a tread band coaxially extending around the belt structure;
wherein at least one of said beads comprises at least one substantially tongue-shaped protrusion extending from its respective base, said protrusion having a length measured along the circumferential direction greater than its width measured along the axial direction;
said length measured along the circumferential direction being lower than the circumference of the tyre measured at the base of said at least one bead and said width measured along the axial direction being lower than the axial width of the base of said at least one bead.

According to a fourth aspect thereof, the present invention relates to a mounting rim for vehicle tyres, comprising a pair of axially outer flanges extending at least in part along a radial direction and delimiting respective bead housing seats, said bead housing seats being circumferentially extending at an axially inner position with respect to said flanges and comprising a base portion;
wherein at least one of said bead housing seats comprises at least one substantially tongue-shaped protrusion extolling from said base portion of the bead housing seat, said protrusion having a length measured along the circumferential direction greater than its width measured along the axial direction;
said length measured along the circumferential direction being lower than the circumference of the rim measured at the base portion of said at least one bead housing seat and said width measured along the axial direction being lower than the axial width of the base portion of said at least one bead housing seat.

According to a fifth aspect thereof, the present invention relates to a mounting rim for vehicle tyres, comprising a pair of axially outer flanges extending at least in part along a radial direction and delimiting respective bead housing seats, said bead housing seats being circumferentially extending at an axially inner position with respect to said flanges and comprising a base portion;
wherein at least one of said bead housing seats comprises at least one tongue seat having a length measured along the circumferential direction greater than its width measured along the axial direction;
said length measured along the circumferential direction being lower than the circumference of the rim measured at the base portion of said at least one bead housing seat and said width measured along the axial direction being lower than the axial width of the base portion of said at least one bead housing seat.

The present invention in at least one of the aforementioned aspects can have at least one of the preferred features which follow.

In the following description, it is to be understood that the geometric features of the mechanical coupling element(s) in the preferred embodiments of the rim according to the invention are clearly intended to be referred to the structural elements (circumference, radius, width of the base portion of the bead housing seat) of the rim itself.

In a preferred embodiment, the wheel of the invention comprises n coupling elements spaced apart from each other along the circumferential direction for coupling together the base of said at least one bead and the base portion of the respective bead housing seat, wherein n is an integer comprised between 2 and 72.

Advantageously, it is possible in this way to increase the coupling stability and effectiveness between the tyre and the rim both along the circumferential direction and along the axial direction.

Within the framework of this preferred embodiment, the aforementioned n mechanical coupling elements have midsections spaced apart from each other along the circumferential direction according to a pitch equal to about $2\pi Rt/n$, wherein Rt is the radius of the tyre measured at the base of the aforementioned at least one bead.

Advantageously, this circumferential distribution with substantially constant pitch of the mechanical coupling elements contributes to distribute in a uniform manner the stresses deriving from the forces transmitted between the tyre and the rim both along the circumferential direction and along the axial direction.

Within the framework of the aforementioned preferred embodiment with several mechanical coupling elements, the wheel of the invention preferably comprises two mechanical coupling elements for coupling together the base of the aforementioned at least one bead and the base portion of the respective bead housing seat, said mechanical coupling elements being arranged on diametrically opposite parts of the wheel.

Alternatively, still within the framework of the aforementioned preferred embodiment with several mechanical coupling elements, the wheel of the invention preferably comprises three mechanical coupling elements for coupling together the base of said at least one bead and the base portion of the respective bead housing seat, the mid-sections of said mechanical coupling elements being spaced apart from each other along the circumferential direction according to a pitch equal to about $2\pi Rt/3$, wherein Rt is the radius of the tyre measured at the base of the aforementioned at least one bead.

Alternatively and still within the framework of the aforementioned preferred embodiment with several mechanical coupling elements, the wheel of the invention preferably comprises a number of mechanical coupling elements equal to the number of adjacent sectors of a vulcanization mould of the tyre.

Still more preferably, the number of the mechanical coupling elements can be equal to 8, 9 or 12.

In this way and as will be better apparent hereinbelow, it is possible to achieve with a suitable arrangement of the mechanical coupling elements, the further advantage of balancing the vibrational forces acting on the wheel and responsible for the noise of the tyre during use.

In a preferred embodiment, the aforementioned at least one mechanical coupling element has an aspect ratio, defined as the ratio between the length of the mechanical coupling element measured along the circumferential direction and the width of this element measured along the axial direction, greater than or equal to 2.

Still more preferably, the aforementioned at least one mechanical coupling element has an aspect ratio comprised between 2 and 100.

Advantageously, this geometric configuration contributes to increase the stability and effectiveness of the coupling between the tyre and the rim along the axial direction, while maintaining at optimal values the coupling stability and effectiveness also along the circumferential direction.

In a preferred embodiment, the aforementioned at least one mechanical coupling element has a length measured along the circumferential direction comprised between 1% and 99% of the length of the circumference of the tyre measured at the base of said at least one bead.

Still more preferably, the length measured along the circumferential direction of said at least one mechanical coupling element is comprised between 2% and 8% of the length of the circumference of the tyre measured at the base of said at least one bead.

Advantageously, this geometric configuration contributes to increase the stability and effectiveness of the coupling between the tyre and the rim along the axial direction.

In a preferred embodiment, the aforementioned at least one mechanical coupling element has a width measured along the axial direction comprised between 10% and 80% of the axial width of the base of said at least one bead.

Still more preferably, the width measured along the axial direction of said at least one mechanical coupling element is comprised between 25% and 75% of the axial width of the base of said at least one bead.

Still more preferably, the aforementioned at least one mechanical coupling element has a width measured along the axial direction comprised between ½ and ¾ of the axial width of the base of said at least one bead.

Advantageously, these preferred geometric configurations allow to achieve the desired stability and effectiveness characteristics of the coupling between the tyre and the rim, both along the axial direction and along the circumferential direction, ensuring that there is in any case a quantity of elastomeric material on each axial side of the mechanical coupling element, and more preferably on axially opposed sides thereof, which is sufficient to ensure an adequate air sealing action.

In a preferred embodiment, the aforementioned at least one mechanical coupling element comprises at least one substantially tongue-shaped protrusion and at least one tongue seat adapted to house said protrusion.

Preferably, the substantially tongue-shaped protrusion and the corresponding tongue seat have a substantially mating shape.

Advantageously, this configuration of the mechanical coupling element allows to achieve the desired stability and effectiveness of the coupling between the tyre and the rim, both along the circumferential and along the axial direction, by means of parts cooperating in abutting relationship with each other that can be made in a simple, reproducible manner and that are in any case very effective in coupling the tyre and the rim together.

In a preferred embodiment and similarly to what has been described above with reference to the mechanical coupling element in its entirety, the aforementioned at least one substantially tongue-shaped protrusion has an aspect ratio, defined as the ratio between the length of the substantially tongue-shaped protrusion measured along the circumferential direction and the width of said protrusion measured along the axial direction, greater than or equal to 2.

Still more preferably, the aforementioned at least one substantially tongue-shaped protrusion has an aspect ratio comprised between 2 and 100.

In a preferred embodiment and similarly to what has been described above with reference to the mechanical coupling element in its entirety, the aforementioned at least one tongue seat has an aspect ratio, defined as the ratio between the length of the tongue seat measured along the circumferential direction and the width of said seat measured along the axial direction, greater than or equal to 2.

Still more preferably, the aforementioned at least one tongue seat has an aspect ratio comprised between 2 and 100.

Within the framework of this preferred embodiment, the aforementioned at least one tongue seat has a length measured along the circumferential direction equal to or greater than the length measured along the circumferential direction of said at least one substantially tongue-shaped protrusion.

In this case, the length measured along the circumferential direction of the tongue seat therefore corresponds to the length measured along the circumferential direction of the mechanical coupling element.

In this way, it is advantageously possible to facilitate the mounting operations of the tyre onto the respective mounting rim.

In the particularly preferred case in which the tongue seat has a length greater than the respective substantially tongue-shaped protrusion, furthermore, the Applicant observed that this geometric configuration further facilitates the mounting operations of the tyre without however significantly modifying the coupling characteristics along the circumferential direction between the tyre and the rim, since an abutting cooperation is in any case ensured along such a direction even in the presence of a clearance between the cooperating parts.

Within the framework of the preferred embodiment in which the aforementioned at least one mechanical coupling element comprises at least one substantially tongue-shaped protrusion and a respective tongue seat, the latter preferably has a length measured along the circumferential direction comprised between 1% and 99% of the length of the circumference of the tyre measured at the base of said at least one bead.

Preferably, the length measured along the circumferential direction of the tongue seat is comprised between 4% and 80% of the length of the circumference of the tyre measured at the base of said at least one bead.

Advantageously, this geometric configuration contributes to increase the stability and effectiveness of the coupling between the tyre and the rim along the axial direction.

Within the framework of the preferred embodiment wherein the aforementioned at least one mechanical coupling element comprises at least one substantially tongue-shaped protrusion and a respective tongue seat, the substantially tongue-shaped protrusion preferably has a length measured along the circumferential direction comprised between 1% and 99% of the length of the circumference of the tyre measured at the base of said at least one bead.

Preferably, the length measured along the circumferential direction of the substantially tongue-shaped protrusion is comprised between 4% and 80% of the length of the circumference measured at the base of said at least one bead.

Advantageously, also this geometric configuration contributes to increase the stability and effectiveness of the coupling between the tyre and the rim along the axial direction.

Preferably, the aforementioned at least one substantially tongue-shaped protrusion comprises a plurality of portions spaced apart from each other along the circumferential direction, while the aforementioned at least one tongue seat comprises a corresponding plurality of portions spaced apart from each other along the circumferential direction and adapted to house a respective portion of said at least one substantially tongue-shaped protrusion.

Advantageously, this multiple portion configuration of the substantially tongue-shaped protrusion and of the corresponding housing seat allows to further increase the number of parts cooperating in abutting relationship present in each mechanical coupling element with a corresponding advantageous distribution of the stresses along the circumferential direction and with an increase of the stability and effectiveness of the coupling between the tyre and the rim, both along the circumferential direction and along the axial direction.

Within the framework of this preferred embodiment, each portion of said at least one substantially tongue-shaped protrusion preferably has a length measured along the circumferential direction comprised between 1% and 49% of the length of the circumference of the tyre measured at the base of said at least one bead.

Preferably, the length measured along the circumferential direction of each portion of said at least one substantially tongue-shaped protrusion is comprised between 2% and 40% of the length of the circumference of the tyre measured at the base of said at least one bead.

Within the framework of this preferred embodiment, moreover, each portion of said at least one tongue seat preferably has a length measured along the circumferential direction comprised between 1% and 49% of the length of the circumference of the tyre measured at the base of said at least one bead.

Preferably, the length measured along the circumferential direction of each portion of said at least one tongue seat is comprised between 2% and 40% of the length of the circumference of the tyre measured at the base of said at least one bead.

In this way, it is advantageously possible to distribute along the circumferential direction the portions of the substantially tongue-shaped protrusion and the portions of the respective housing seat so as to optimise the coupling stability and effectiveness between the tyre and the rim both along the circumferential and along the axial direction.

Within the framework of this preferred embodiment, the aforementioned advantageous technical effects may be achieved both when the portions of the substantially tongue-shaped protrusion and the portions of the respective housing seat have a same length measured along the circumferential direction, and when these portions have different lengths measured along the circumferential direction.

Preferably, said at least one tongue seat has a width measured along the axial direction equal to or greater than the width measured along the axial direction of said at least one substantially tongue-shaped protrusion.

In this case, the width measured along the axial direction of the tongue seat therefore corresponds to the width measured along the axial direction of the mechanical coupling element.

Preferably, said at least one tongue seat has a width measured along the axial direction comprised between 10% and 80% of the axial width of the base of said at least one bead.

Still more preferably, the width measured along the axial direction of said at least one tongue seat is comprised between 25% and 75% of the axial width of the base of said at least one bead.

In a preferred embodiment, said at least one substantially tongue-shaped protrusion has a width along the axial direction comprised between 10% and 80% of the axial width of the base of said at least one bead.

Preferably, the width measured along the axial direction of said at least one substantially tongue-shaped protrusion is comprised between 25% and 75% of the axial width of the base of said at least one bead.

Advantageously, these preferred geometric configurations of the substantially tongue-shaped protrusion and of the respective housing seat allow to facilitate the mounting operations of the tyre onto the corresponding mounting rim and, as illustrated above, to attain at the same time the desired characteristics of coupling stability and effectiveness between the tyre and the rim both along the axial direction and along the circumferential direction, ensuring that there is in any case a quantity of elastomeric material on at least one axial side of the mechanical coupling element, and more preferably on axially opposite parts thereof, sufficient to ensure a suitable air sealing action.

In the preferred embodiment in which the mechanical coupling element comprises at least one tongue seat formed in the base of the bead, moreover, this geometric configuration allows to have the desired characteristics of coupling stability and effectiveness between the tyre and the rim both along the axial direction and along the circumferential direction without negatively affecting the mechanical strength characteristics of the base portion of the bead.

Preferably, the aforementioned at least one substantially tongue-shaped protrusion is radially extending from the base portion of the bead housing seat defined in said rim, while the aforementioned at least one tongue seat adapted to house said at least one protrusion is radially formed in the base of said at least one bead of the tyre.

Advantageously, this embodiment allows to make in a sufficiently precise manner the substantially tongue-shaped protrusion during the rim manufacturing process, generally carried out by means of casting or moulding, so to have a greater tolerance in making the tongue seat formed during the moulding and vulcanization operations of the tyre, which are generally more difficult to control in a precise manner.

Preferably, the aforementioned at least one substantially tongue-shaped protrusion is radially extending from the base of said at least one bead of the tyre, while the aforementioned at least one tongue seat adapted to house said at least one protrusion is radially formed in the base portion of the bead housing seat defined in the rim.

Preferably, said at least one substantially tongue-shaped protrusion has a height measured along the radial direction equal to or greater than the depth measured along the radial direction of said at least one tongue seat.

In this way, it is advantageously possible to further increase the air sealing characteristics at the mechanical coupling element since in both cases—with protrusion radially extending from the base of the bead or from the base portion of the respective bead housing seat—there is a slight and predetermined compression deformation of the elastomeric material which constitutes the bead with an increase of the sealing characteristics.

If the substantially tongue-shaped protrusion is radially extending from the rim, in fact, the protrusion will compress in a predetermined manner the elastomeric material of the bottom of the respective tongue seat radially formed in the base of the bead of the tyre, while in the opposite case, in which the substantially tongue-shaped protrusion is radially extending from the base of the bead, the elastomeric material of the protrusion is compressed in a predetermined manner by cooperating in abutting relationship with the bottom of the respective tongue seat radially formed in the base portion of the bead housing seat of the rim.

Preferably, the aforementioned at least one substantially tongue-shaped protrusion has a height measured along the radial direction comprised between 1 mm and 2.5 mm.

Still more preferably, the height measured along the radial direction of the aforementioned at least one substantially tongue-shaped protrusion is comprised between 1.5 mm and 2 mm.

Preferably, the aforementioned at least one tongue seat preferably has a depth measured along the radial direction comprised between 0.9 mm and 2.4 mm.

Still more preferably, the depth measured along the radial direction of the aforementioned at least one tongue seat is comprised between 1.4 mm and 1.9 mm.

Advantageously, this geometric configuration allows to optimise the air sealing characteristics of the mechanical coupling element without deforming the elastomeric material composing the bead in an uncontrolled manner.

In a particularly preferred embodiment, the aforementioned at least one substantially tongue-shaped protrusion is integral with the rim. In particular, the aforementioned at least one protrusion is radially extending integrally from the base portion of the bead housing seat, so to be advantageously obtained during the manufacturing operations by moulding or casting of the rim itself.

In an alternative preferred embodiment, the aforementioned at least one substantially tongue-shaped protrusion can be a structurally independent element stably associated to said rim by means of gluing or welding or riveting, subsequent to the manufacturing operations of the rim itself.

This preferred embodiment advantageously allows to manufacture the wheel of the invention without providing a dedicated line of rims by using standard rims even if more labour is involved in the wheel assembling operations.

In a further preferred embodiment, the aforementioned at least one substantially tongue-shaped protrusion is integral with the tyre bead. In particular, the aforementioned at least one protrusion is radially extending integrally from the base of the bead, so that it can be advantageously obtained during the moulding and vulcanization operations of the tyre itself.

In a preferred embodiment, the aforementioned at least one mechanical coupling element is arranged substantially astride of at least one build-up line of elastomeric material radially extending in said tyre and formed at a separation line between adjacent sectors of a vulcanization mould of the tyre.

In this way, it is possible to achieve the additional advantage of reducing the vibrational forces acting on the wheel and responsible for the noise of the tyre during use.

Within the framework of this preferred embodiment, it is particularly advantageous to provide a number of mechanical coupling elements equal to the number of sectors of the tyre vulcanization mould and to arrange each of these mechanical coupling elements substantially astride of the build-up lines of elastomeric material extending radially and formed at the separation line between adjacent sectors of the mould.

In the preferred embodiments described above, the various parts of the mechanical coupling element(s) can be arranged in any suitable position of the axial development of the base of the bead and of the base portion of the corresponding bead housing seat, preferably ensuring that the mechanical coupling element(s) are surrounded by the elastomeric material which constitutes the bead, so as to maximise the air sealing action.

Preferably, the mechanical coupling element(s) can be arranged substantially astride of a circumferential centre line of the base of the bead or of the base portion of the corresponding bead housing seat.

In an alternative preferred embodiment, the mechanical coupling element(s) can be entirely or partly arranged at an axially inner or at an axially outer side with respect to a circumferential centre line of the base of the bead or of the base portion of the corresponding bead housing seat.

Preferably, the mechanical coupling element(s) are arranged at the interface between the base of the bead located at an outer wheel side and the base portion of the respective bead housing seat of the rim located at an outer wheel side.

Alternatively, the mechanical coupling element(s) can be arranged at the interface between the base of both the beads of, the tyre and the base portion of the respective bead housing seats. Said coupling element(s) is (are) arranged in both the tyre/rim coupling zones, located at an outer wheel side and located at an inner wheel side.

In a preferred embodiment, the wheel of the invention further comprises at least one mark arranged on the tyre and/or on the rim at the aforementioned at least one mechanical coupling element.

Preferably, the aforementioned at least one mark is arranged on the tyre and/or on the rim at an outer wheel side thereof.

In this way, it is advantageously possible to further facilitate the mounting operations so as to ensure a correct cooperation of parts in abutting relationship, preventing incorrect arrangements which may somehow affect the characteristics of hermetic sealing at the mechanical coupling element(s).

BRIEF DESCRIPTION OF THE FIGURES

Additional features and advantages will be better apparent from the following description of a preferred embodiment of a wheel for vehicles according to the invention, made—for illustrating and non-limiting purposes—with reference to the attached drawings.

In such drawings.

DETAILED DESCRIPTION OF THE PREFERRED EMBODIMENTS

Figure 1:
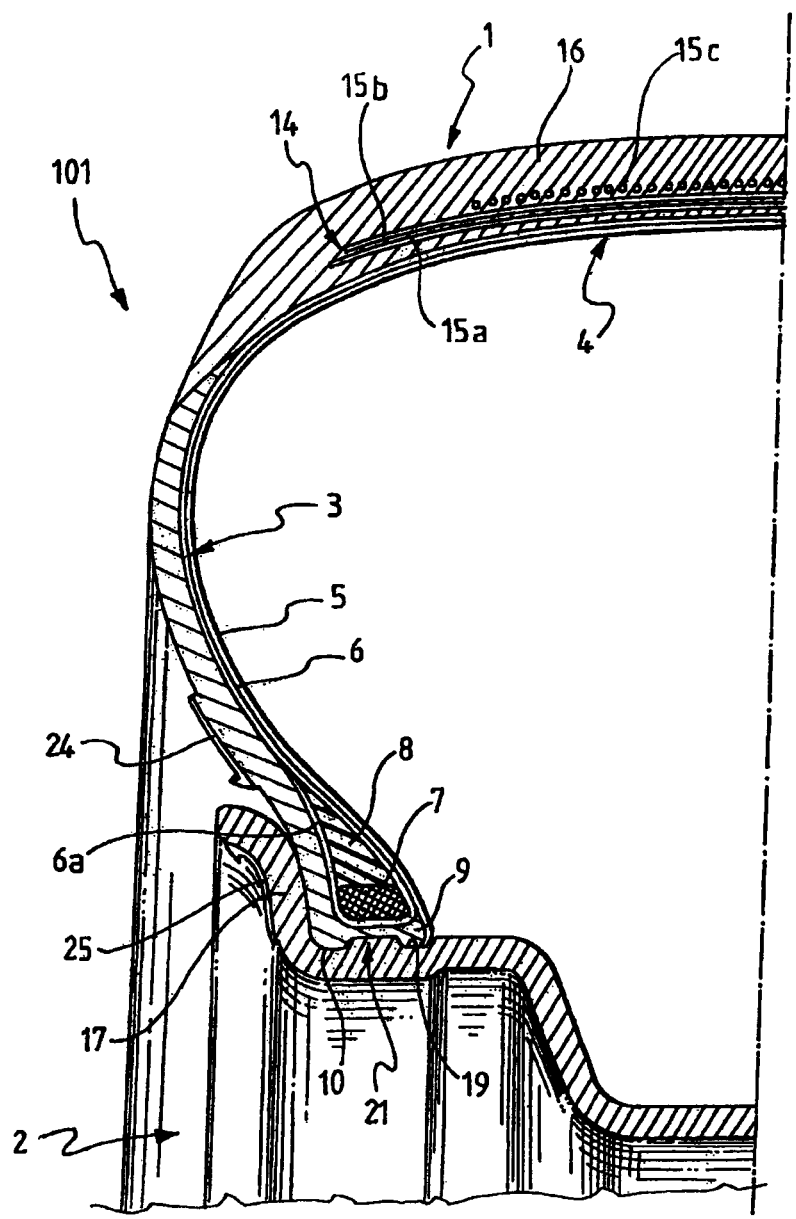
FIG. 1 is a cross sectional view of a first preferred embodiment of a wheel according to the invention which for the sake of simplicity illustrates only the axially outer part of the tyre and of the respective mounting rim.

With reference to FIGS. 1-5, a wheel for vehicles according to a first preferred embodiment of the invention, which can have a preferred although not exclusive use both on cars with high or very high performances, so-called HP (High Performance) or UHP (Ultra High Performance), and on heavy vehicles adapted, for example, to cover long travels in motorways or for heavy uses, is generally indicated at 101.

The wheel 101 comprises a tyre 1 and a respective mounting rim 2, which will be described in more detail hereinbelow.

The tyre 1 comprises a carcass structure 3, including a central crown portion 4 and two sidewalls 5, provided with a reinforcing ply 6 whose opposite lateral edges 6a are turned around respective bead cores 7.

On the radially outer peripheral edge of the bead cores 7, an elastomeric filler 8 which fills the space defined between the reinforcing ply 6 and the respective lateral edge 6a of the reinforcing ply 6, is applied.

As is known, the opposite zones of the tyre comprising each of the bead cores 7 and the filler 8 form respective annular structures, the so-called beads 9, intended for anchoring the tyre 1 on the Corresponding mounting rim 2 of the wheel 101 of the vehicle.

Figure 2:
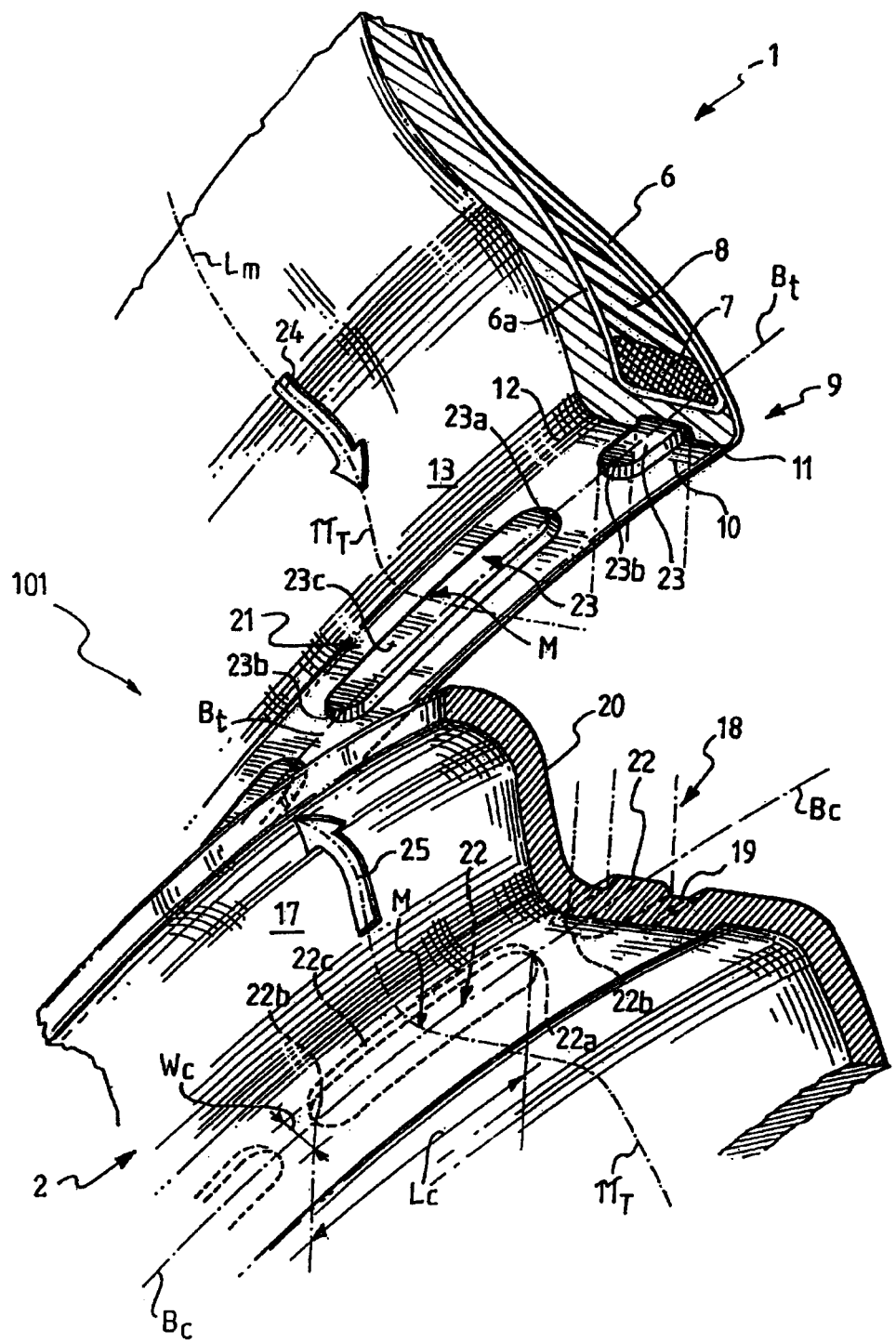
FIG. 2 is an exploded perspective view, in cross section and in enlarged scale, of some details of the tyre bead and of the respective bead housing seat of the rim of the wheel of FIG. 1 in a tyre/rim coupling zone located at the outer side of the wheel.

Each of the beads 9 comprises—as is better shown in FIG. 2—a base 10, extending between an axially inner edge 11 and an axially outer edge 12 of the bead 9, and a side portion 13. The base 10 and the side portion 13 of the bead 9 are adapted to cooperate in abutting relationship along a radial and, respectively, along an axial direction with respective portions of a bead housing seat formed in the rim 2, which will be discussed below.

A belt structure 14 comprising one or more belt strips 15a, 15b, 15c made of textile or metal cords embedded in a rubber sheet is coaxially associated to the carcass structure 3.

In a known manner, a tread band 16 by means of which the tyre 1 contacts the ground is applied on the belt structure 14. The tread band 16 generally comprises a plurality of grooves and blocks, not illustrated for the sake of simplicity, forming a suitable tread pattern intended to impart to the tyre 1 the desired traction, road-holding and water draining characteristics.

The rim 2 comprises in turn a pair of axially outer flanges 17, extending at least in part along the radial direction and delimiting respective bead housing seats 18 circumferentially extending at an axially inner position with respect to the flanges 17, as is better illustrated in FIG. 2.

Each of the bead housing seats 18 comprises a base portion 19 adapted to cooperate in abutting relationship with the base 10 of the bead 9 and a side portion 20 adapted to cooperate in abutting relationship with the side portion 13 of the bead 9.

In the preferred embodiment illustrated in the figures, the base 10 of the axially outer bead 9 (that is, the bead 9 located at an outer side of the wheel visible in FIG. 1) or, still more preferably, the base 10 of both the beads 9 of the tyre 1 and the base portion 19 of the respective bead housing seats 18, are mutually coupled by means of at least one mechanical coupling element 21 arranged at an interface between the base 10 of the bead 9 and the base portion 19 of the bead housing seat 18.

Preferably, the base 10 of the beads 9 and the base portion 19 of the respective bead housing seats 18 are mutually coupled by means of a plurality of n mechanical coupling elements 21, preferably in a number equal to the number of adjacent sectors of the vulcanization mould of the tyre 1. In a preferred embodiment, the wheel 101 can for example comprise eight mechanical coupling elements 21.

Preferably, the mechanical coupling elements 21 have midsections M—defined as described above by a transversal centre plane $\pi_T$ thereof—spaced apart from each other along the circumferential direction according to a pitch equal to about $2\pi Rt/n$, wherein Rt is the radius of the tyre 1 measured at the base 10 of the bead 9. In the case in which there are eight mechanical coupling elements 21, as in the preferred embodiment illustrated in the figures, therefore, the mechanical coupling elements have mid-sections M spaced apart from each other along the circumferential direction according to a pitch equal to about πRt/4.

Preferably, furthermore, the mechanical coupling elements 21 are arranged substantially astride of build-up lines of elastomeric material, schematically indicated at Lm in the figures, radially extending and formed at the separation line between adjacent sectors of the vulcanization mould of the tyre 1. In the embodiment illustrated in the figures, therefore, the build-up lines Lm are substantially coincident with the trace of the transversal centre plane $\pi_T$ of the mechanical coupling elements 21.

By means of this arrangement, it is advantageously possible to balance the vibrational forces acting on the wheel 101 and reduce the noise of the tyre 1 during use (for example, the eighth harmonic in the preferred case of eight mechanical coupling elements).

Each of the mechanical coupling elements 21 is provided with parts cooperating in abutting relationship along the circumferential and along the transversal direction and has a length Lc measured along the circumferential direction greater than its width Wc measured along the axial direction.

As illustrated in the figures, the length Lc of the mechanical coupling elements 21 is lower than the circumference of the tyre 1 measured at the base 10 of said at least one bead 9, while the aforementioned width Wc is lower than the axial width of the base 10 of the bead 9 and of the base portion 19 of the respective bead housing seat 18.

Preferably, the mechanical coupling elements 21 are arranged substantially astride of a circumferential centre line Bt of the base 10 of the bead 9 and of a circumferential centre line Bc of the base portion 19 of the corresponding bead housing seat 18.

Advantageously, this arrangement of the mechanical coupling elements 21 allows to achieve the desired characteristics of coupling stability and effectiveness between the tyre 1 and the rim 2, both along the axial direction and along the circumferential direction, ensuring that there is in any case a quantity of elastomeric material on at least one axial side of the mechanical coupling elements 21, preferably on axially opposite sides thereof, sufficient to ensure a suitable air sealing action.

Preferably, the mechanical coupling elements 21 have an aspect ratio Lc/Wc greater of equal to 2, in this case preferably equal to 10.

In the preferred embodiment illustrated in FIGS. 1-5, the mechanical coupling elements 21 comprise a substantially tongue-shaped protrusion 22 radially extending from the base portion 19 of the bead housing seat 18 defined in the rim 2 and a tongue seat 23 adapted to house the protrusion 22 radially formed in the base 10 of the bead 9 of the tyre 1.

Preferably, the substantially tongue-shaped protrusion 22 and the respective tongue seat 23 have a substantially mating shape.

Preferably, the substantially tongue-shaped protrusion 22 is integral with the rim 2 and in particular is radially extending integrally from the base portion 19 of the bead housing seat 18, so as to be advantageously obtained during the manufacturing operations by moulding or casting of the rim 2 itself.

Figure 5:
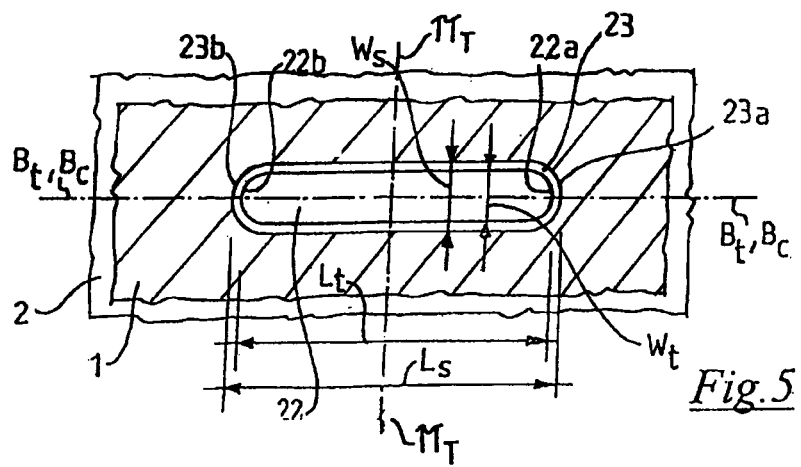
FIG. 5 is a schematic top view, in partial longitudinal and cross section, in further enlarged scale, of the tyre/rim coupling zone illustrated in FIG. 4 in which other details of the mechanical coupling element between the tyre bead and the respective bead housing seat of the rim are visible.
Figure 6:
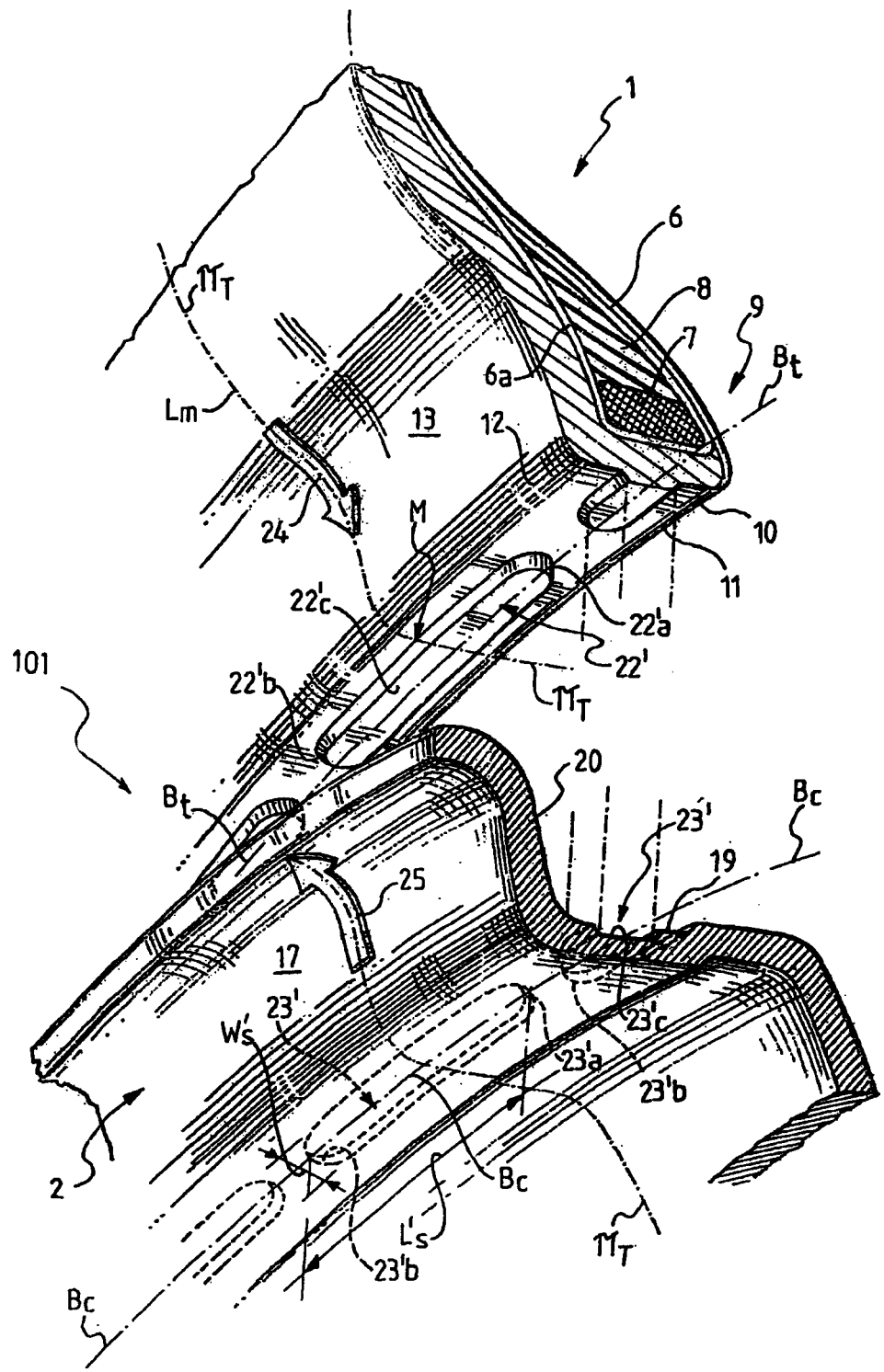
FIG. 6 is an exploded perspective view, in cross section and in enlarged scale, of some details of the bead of a tyre and of the bead housing seat of the rim located at an outer side of the wheel of a second preferred embodiment of a wheel according to the invention.
Figure 7:
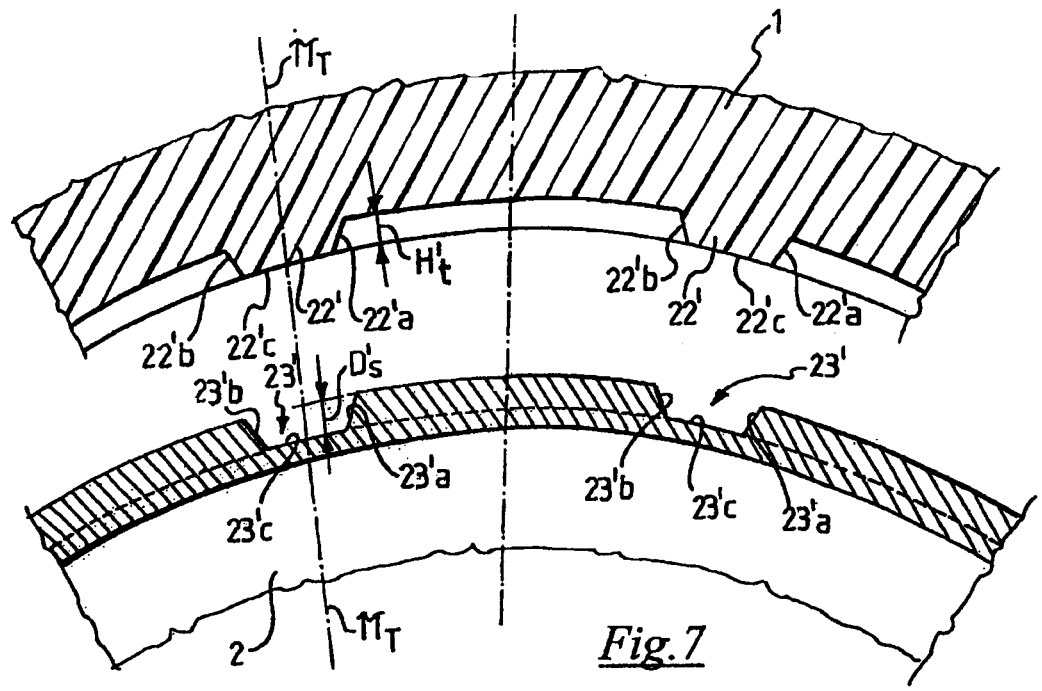
FIG. 7 is an exploded schematic lateral view, in longitudinal section and in enlarged scale, of some details of the tyre and of the respective bead housing seat of the of the wheel of FIG. 6 in a tyre/rim coupling zone located at an outer side of the wheel.
Figure 8:
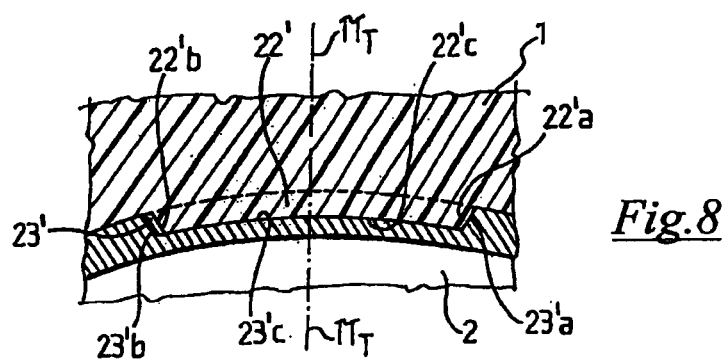
FIG. 8 a schematic lateral view, in longitudinal section and in further enlarged scale, of a tyre/rim coupling zone wherein some details of a mechanical coupling element between the bead of the tyre and the respective bead housing seat of the rim of the wheel of FIG. 6 are visible.

In the preferred embodiment illustrated in FIGS. 1-5, the tongue seat 23 has a length Ls measured along the circumferential direction greater than the length Lt measured along the circumferential direction of said at least one substantially tongue-shaped protrusion 22 (see FIG. 5).

In this way, it is advantageously possible to facilitate the mounting operations of the tyre 1 onto the respective mounting rim 2 without significantly modifying the coupling characteristics along the circumferential direction between the tyre 1 and the rim 2, since a cooperation in abutting relationship is ensured in such a direction even in the presence of a clearance between the cooperating parts, in this case between the circumferentially opposed outer walls 22a, 22b of the protrusion 22 and the circumferentially opposed end walls 23a, 23b of the tongue seat 23 (see FIGS. 2-5).

Preferably, the tongue seat 23 has a length Ls measured along the circumferential direction comprised between 0.5% and 10% of the length of the circumference of the tyre 1 measured at the base 10 of the bead 9.

On the other hand, the substantially tongue-shaped protrusion 22 preferably has a length Lt measured along the circumferential direction comprised between 0.4% and 9.9% of the length of the circumference of the tyre 1 measured at the base 10 of the bead 9.

Advantageously, this preferred geometric configuration of the substantially tongue shaped protrusion 22 and of the tongue seat 23 adapted to house the protrusion 22 contributes to increase the stability and effectiveness of the coupling between the tyre 1 and the rim 2 along the axial direction.

In the preferred embodiment illustrated in FIGS. 1-5, the tongue seat 23 preferably has a width Ws measured along the axial direction greater than the width Wt measured along the axial direction of the substantially tongue-shaped protrusion 22 (see FIG. 5).

More preferably, the tongue seat 23 has a width Ws measured along the axial direction comprised between 25% and 75% of the axial width of the base 10 of the bead 9.

Preferably, the substantially tongue-shaped protrusion 22 has a width Wt measured along the axial direction comprised between 24% and 74% of the axial width of the base 10 of the bead 9.

Advantageously, these preferred geometric configurations of the substantially tongue-shaped protrusion 22 and of the respective tongue housing seat 23 allow to facilitate the mounting operations of the tyre 1 onto the respective mounting rim 2, and as described above allow to achieve at the same time the desired characteristics of coupling stability and effectiveness between the tyre 1 and rim 2 both along the axial and along the circumferential direction.

The preferred arrangement of the protrusion 22 and of the respective housing seat 23 of the mechanical coupling means 21 substantially astride of the circumferential centre line Bc of the base portion 19 of the bead housing seat 18 and, respectively, of the circumferential centre line Bt of the base 10 of the bead 9, moreover, ensures that there is in any case a quantity of elastomeric material on axially opposite sides of the mechanical coupling elements 21 sufficient to ensure a suitable air sealing action.

The preferred geometric configuration of the tongue seat 23 described above, moreover, allows to have the desired characteristics of coupling stability and effectiveness between the tyre 1 and the rim 2 both along the axial direction and along the circumferential direction, without negatively affecting the mechanical strength characteristics of the base portion (i.e., the radially innermost portion) of the bead 9.

In the preferred embodiment illustrated in FIGS. 1-5, therefore, the tongue seat 23 defines, the maximum size of the mechanical coupling elements 21 between the tyre 1 and the rim 2 both along the circumferential direction and along the axial direction.

In other words, the length Lc measured along the circumferential direction of the mechanical coupling elements 21 corresponds to the length Ls measured along the circumferential direction of the tongue seat 23, and the width Wc measured along the axial direction of the mechanical coupling elements 21 corresponds to the width Ws measured along the axial direction of the tongue seat 23.

Figure 3:
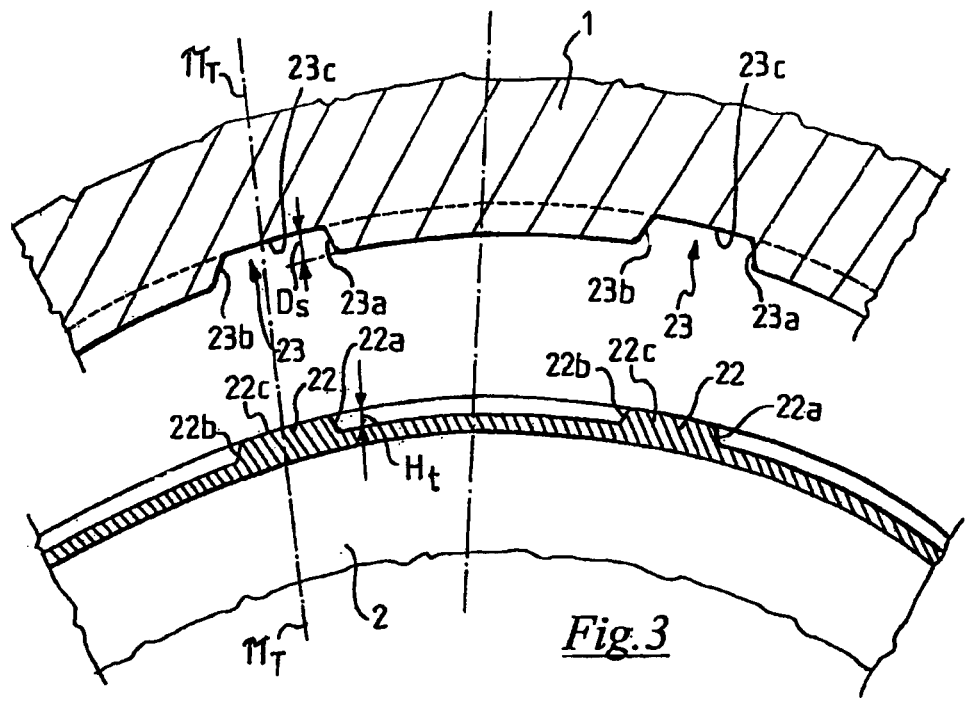
FIG. 3 is an exploded schematic lateral view, in longitudinal section and in enlarged scale, of some details of the bead of the tyre and of the respective bead housing seat of the rim of the wheel of FIG. 1 in a tyre/rim coupling zone located at the outer side of the wheel.
Figure 4:
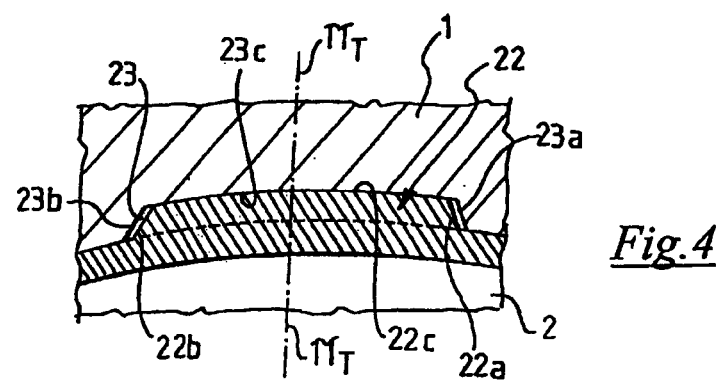
FIG. 4 a schematic lateral view, in longitudinal section and in further enlarged scale, of a tyre/rim coupling zone in which some details of the mechanical coupling element between the tyre bead and the respective bead housing seat of the rim of the wheel of FIG. 1 are visible.

Preferably, the substantially tongue-shaped protrusion 22 has a height Ht measured along the radial direction greater than the depth Ds measured along the radial direction of the tongue seat 23 (see FIG. 3).

In this way, it is advantageously possible to further increase the air sealing characteristics at the mechanical coupling elements 21, since there is a light and predetermined compression deformation of the elastomeric material which constitutes the bead 9, with an increase of the sealing properties. The upper wall 22c of the protrusion 22 radially extending from the rim 2, in fact, compresses in a predetermined manner the elastomeric material of the bottom 23c of the corresponding tongue seat 23 radially formed in the base 10 of the bead 9 of the tyre 1, thus ensuring optimal air sealing characteristics.

Preferably, the substantially tongue-shaped protrusion 22 has a height Ht measured along the radial direction comprised between 1.5 mm and 2 mm, while the tongue seat 23 preferably has a depth Ds measured along the radial direction comprised between 1.4 mm and 1.9 mm.

Advantageously, this geometric configuration allows to optimise the air sealing properties at the mechanical coupling elements 21 without deforming in an uncontrolled manner the elastomeric material which constitutes the bead 9.

In the preferred embodiment illustrated in the figures, the wheel 1 further comprises at least one mark 24, more preferably a plurality of marks 24 arranged on the tyre 1 and at least one mark 25, more preferably a plurality of marks 25 arranged on the rim 2 at the mechanical coupling elements 21.

More precisely, the marks 24 are arranged on the tyre 1 at the transversal centre plane $\pi_T$ of the mechanical coupling elements 21, in particular of the tongue seat 23, while the marks 25 are arranged on the rim at the aforementioned transversal centre plane $\pi_T$, in particular at the substantially tongue-shaped protrusion 22 (see FIG. 2).

Preferably, the marks 24, 25 are arranged on the tyre 1 and on the rim 2 at the outer side of the wheel 101.

In this way, it is advantageously possible to facilitate the mounting operations of the tyre 1 onto the rim 2 and to ensure a correct abutting cooperation of parts, preventing an incorrect positioning of the substantially tongue-shaped protrusions 22 in the tongue seats 23 which can somehow affect the hermetic sealing characteristics of the tyre 1 at the mechanical coupling elements 21.

With reference to FIGS. 6-11, further preferred embodiments of the wheel 101, of the tyre 1 and of the rim 2 according to the invention will now be illustrated.

In the following description and in such figures, the elements of the wheel 101, of the tyre 1 and of the rim 2 which are structurally and functionally equivalent to those described above with reference to the embodiment shown in FIGS. 1-5 will be indicated with the same reference numbers and will not be further described.

In the preferred embodiment illustrated in FIGS. 6-9, the mechanical coupling elements 21 are configured in a manner complementary to that illustrated with reference to the preceding preferred embodiment of the wheel 101.

In the preferred embodiment illustrated in FIGS. 6-9, in fact, the mechanical coupling elements 21 comprise at least one substantially tongue-shaped protrusion 22' radially extending from the base 10 of the bead 9 of the tyre 1 and at least one tongue seat 23' adapted to house the protrusion 22' radially formed in the base portion 19 of the bead housing seat 18 defined in the rim 2.

Preferably, the substantially tongue-shaped protrusion 22' is integral with the tyre 1 and is in particular radially extending integrally from the base 10 of the bead 9, so that it can be advantageously obtained during the moulding and vulcanization operations of the tyre 1 itself.

Figure 9:
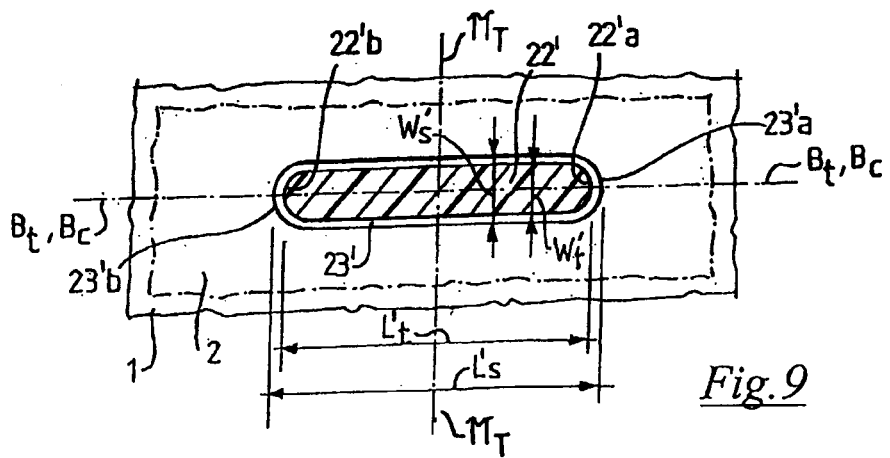
FIG. 9 is a schematic top view, in partial longitudinal and cross section, in further enlarged scale, of the tyre/rim coupling zone illustrated in FIG. 8, in which other details of the mechanical coupling element between the bead of the tyre and the respective bead housing seat of the rim are visible.

Also in the preferred embodiment illustrated in FIGS. 6-9, the tongue seat 23', this time formed in the rim 2, has a length L's measured along the circumferential direction preferably greater than the length L't measured along the circumferential direction of the substantially tongue-shaped protrusion 22' (see FIG. 9).

In an entirely analogous manner to the preceding preferred embodiment, it is advantageously possible in this way to facilitate the mounting operations of the tyre 1 onto the respective mounting rim 2, without significantly modifying the coupling characteristics along the circumferential direction between the tyre 1 and the rim 2, since an abutting cooperation along such a direction is ensured even in the presence of a clearance between the cooperating parts, in this case between the circumferentially opposed end walls 22'a, 22'b of the protrusion 22' and the circumferentially opposed end walls 23'a, 23'b of the tongue seat 23' (see FIGS. 6-9).

Preferably, the tongue seat 23' has a length L's measured along the circumferential direction and a width W's measured along the axial direction entirely analogous to those (Ls and Ws) of the tongue seat 23 of the preceding preferred embodiment of the wheel 101 illustrated with reference to FIGS. 1-5.

Similarly, the substantially tongue-shaped protrusion 22' preferably has a length L't measured along the circumferential direction and a width W't measured along the axial direction entirely analogous to those (Lt and Wt) of the protrusion 22 of the preceding preferred embodiment of the wheel 101 illustrated with reference to FIGS. 1-5.

Also in the preferred embodiment illustrated in FIGS. 6-9, therefore, the tongue seat 23' formed in the rim 2 defines the maximum dimensions of the mechanical coupling elements 21 between the tyre 1 and the rim 2, both along the circumferential direction and along the axial direction.

In a similar manner to the preceding preferred embodiment, the substantially tongue-shaped protrusion 22' radially extending from the base 10 of the bead 9 has a height H't measured along the radial direction greater than the depth D's measured along the radial direction of the tongue seat 23' radially formed in the base portion 19 of the bead housing seat 18 of the rim 2.

Also in this case, it is therefore advantageously possible to further increase the air sealing characteristics at the mechanical coupling elements 21 since there is a slight and predetermined compression deformation of the elastomeric material which constitutes the protrusion 22' of the bead 9 with an increase of the sealing properties.

The elastomeric material of the protrusion 22', in fact, will be compressed in a predetermined manner as a consequence of the abutment cooperation of its upper wall 22'c with the bottom 23'c of the respective tongue seat 23' radially formed in the base portion 19 of the bead housing seat 18 of the rim 2.

The substantially tongue-shaped protrusion 22' and the tongue seat 23' respectively have a preferred height H't and depth D's measured along the radial direction entirely analogous to those (Ht and Ds) of the protrusion 22 and of the seat 23 of the preceding preferred embodiment of the wheel 101 illustrated with reference to FIGS. 1-5.

The mechanical coupling elements 21 of the preferred embodiment illustrated in FIGS. 6-9 therefore achieve, with a complementary configuration of the mechanical coupling elements 21, all the advantageous technical effects illustrated above with reference to the previous preferred embodiment of the wheel 101 illustrated with reference to FIGS. 1-5.

Figure 10:
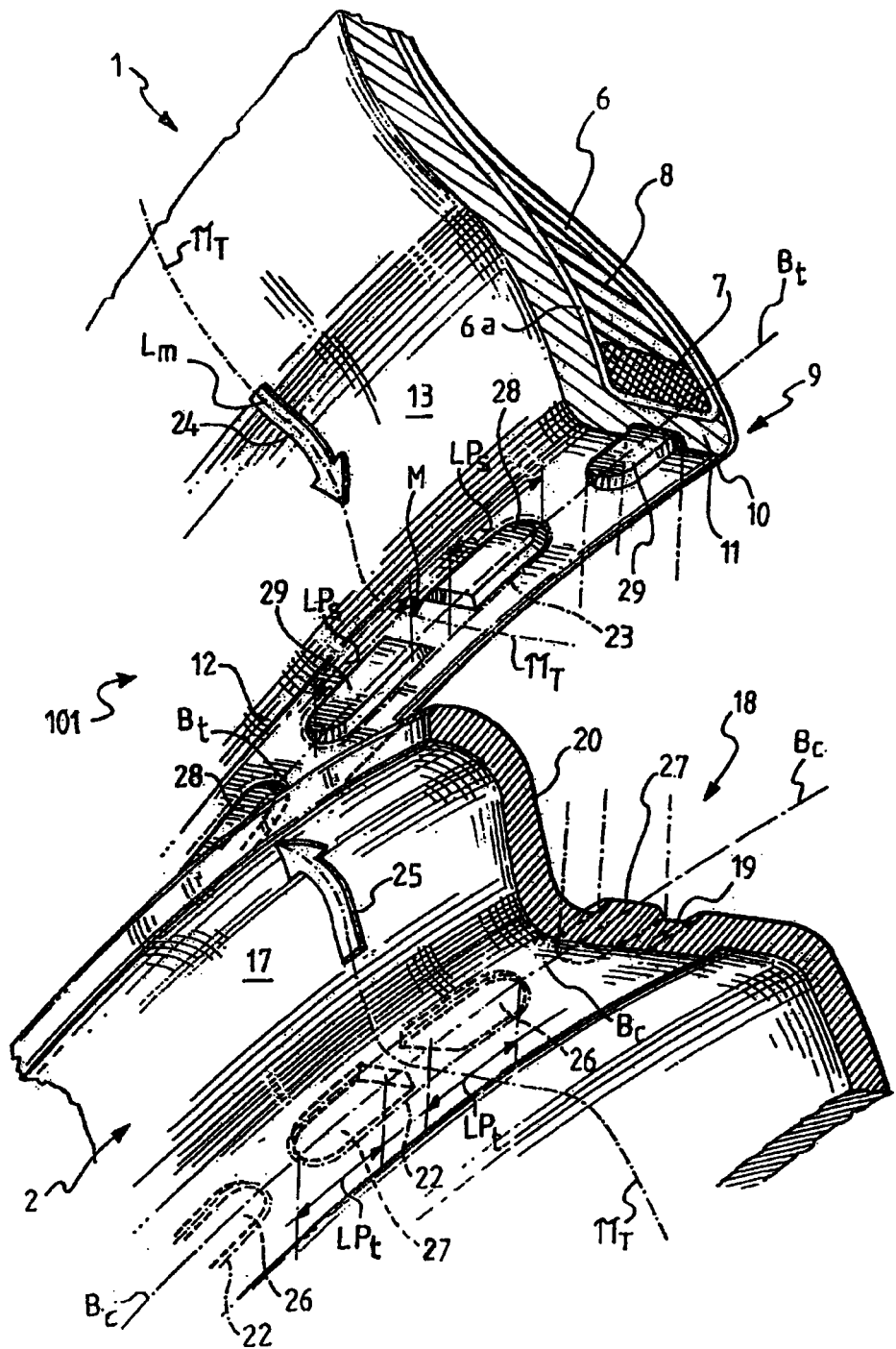
FIG. 10 is an exploded perspective view, in cross section and in enlarged scale, of some details of the bead of a tyre and of the bead housing seat of the rim located at an outer side of the wheel, of a third preferred embodiment of a wheel according to the invention.

In the preferred embodiment of FIG. 10, an alternative embodiment of the wheel 101 according to the first embodiment according to FIGS. 1-5 is illustrated.

In this further preferred embodiment, at least one or preferably all the mechanical coupling elements 21 of the wheel 101 comprise a substantially tongue-shaped protrusion 22 radially extending from the rim 2 which, rather than being integrally formed as in the preferred embodiment illustrated in FIGS. 1-5, comprises in turn a plurality of portions 26, 27 spaced apart from each other along the circumferential direction.

In this case, the respective tongue seat 23 formed in the base 10 of the bead 9 therefore comprises a plurality of seat portions 28, 29 spaced apart from each other along the circumferential direction and adapted to house one of the respective portions 26, 27 of the substantially tongue-shaped protrusion 22.

Advantageously, this multiple portion configuration of the protrusion 22 and of the respective housing seat 23 allows to increase the number of parts cooperating in abutting relationship of each mechanical coupling element 21 with a corresponding increase of the distribution of the stresses and of the coupling stability and effectiveness between the tyre 1 and the rim 2, both along the circumferential direction and along the axial direction.

Also in this further preferred embodiment, the portions 26, 27 of the substantially tongue-shaped protrusion 22 and the portions 28, 29 of the tongue seat 23 have a substantially mating shape.

Also in this preferred embodiment, each of the portions 28, 29 of the tongue seat 23 preferably has a length LPs measured along the circumferential direction greater than the length LPt measured along the circumferential direction of the corresponding portions 26, 27 of the protrusion 22, so as to obtain the aforementioned advantageous technical effect of facilitating the mounting operations of the tyre 1 onto the corresponding mounting rim 2 without significantly modifying the coupling characteristics between tyre 1 and the rim 2 along the circumferential direction.

Preferably, each of the portions 28, 29 of the tongue seat 23 preferably has a length LPs measured along the circumferential direction comprised between 2% and 40% of the length of the circumference of the tyre 1 measured at the base 10 of the bead 9.

Preferably, each of the portions 26, 27 of the substantially tongue-shaped protrusion 22 preferably has a length LPt measured along the circumferential direction comprised between 1.9% and 39.9% of the length of the circumference of the tyre 1 measured at the base 10 of the bead 9.

In this way, it is advantageously possible to distribute along the circumferential direction the portions 26, 27 of the substantially tongue-shaped protrusion 22 and the portions 28, 29 of the corresponding housing seat 23, so as to optimise the coupling stability and effectiveness between the tyre 1 and the rim 2 both along the circumferential direction and along the axial direction.

Within the framework of this preferred embodiment, the aforementioned advantageous technical effects can be achieved both when the portions 26, 27 of the substantially tongue-shaped protrusion 22 have a same length LPt, and when such portions have different lengths LPt measured along the circumferential direction. Clearly, this holds true also for the corresponding portions 28, 29 of the housing seat 23 of the protrusion 22.

Figure 11:
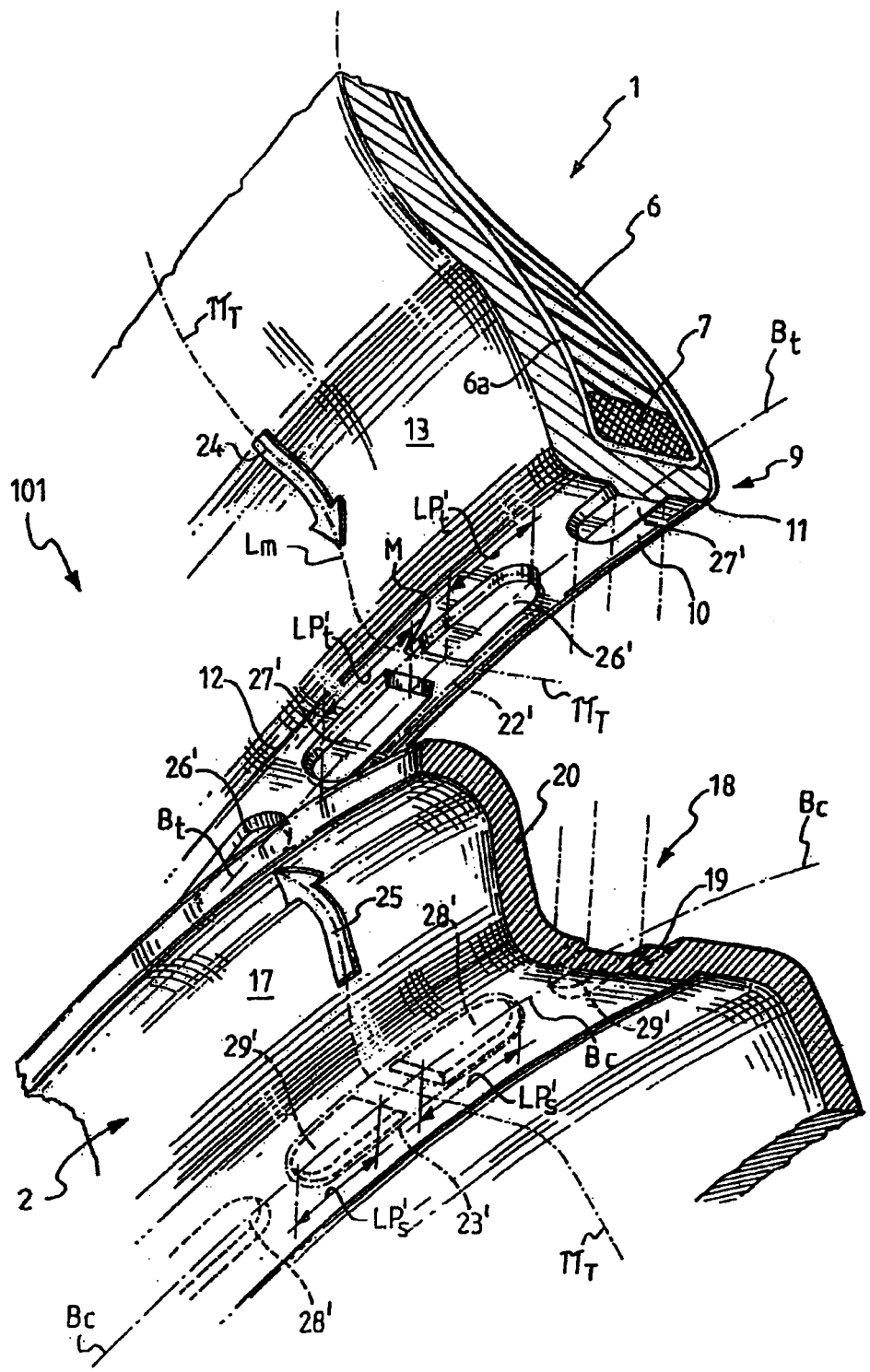
FIG. 11 is an exploded perspective view, in cross section and in enlarged scale, of some details of the bead of a tyre and of the bead housing seat of the rim located at an outer side of the wheel, of a fourth preferred embodiment of a wheel according to the invention.

In the preferred embodiment of FIG. 11, an additional embodiment of the wheel 101 in accordance with the second embodiment of FIGS. 6-9 is illustrated.

In this further preferred embodiment, at least one and preferably all the mechanical coupling elements 21 comprise a substantially tongue-shaped protrusion 22' and a respective tongue seat 23' for its housing configured in a manner complementary to that illustrated in FIG. 10 with reference to the preceding preferred embodiment of the wheel 101.

In other words, the wheel 101 comprises mechanical coupling elements 21 comprising in turn a substantially tongue-shaped protrusion 22' radially extending from the base 10 of the bead 9 which, rather than being formed in one piece as in the preferred embodiment illustrated in FIGS. 6-9, comprises in turn a plurality of portions 26', 27' spaced apart from each other along the circumferential direction.

In this case, the respective tongue seat 23' radially formed in the base portion 19 of the bead housing seat 18 formed in the rim 2 thus comprises a plurality of seat portions 28', 29' spaced apart from each other along the circumferential direction and adapted to house one of the respective portions 26', 27' of the protrusion 22'.

Also in this further preferred embodiment, the portions 26', 27' of the substantially tongue-shaped protrusion 22' and the portions 28', 29' of the tongue seat 23 have a substantially mating shape.

Preferably, each of the portions 28', 29' of the tongue seat 23' has a length LP's measured along the circumferential direction that is entirely analogous to that LPs of the portions 28, 29 of the tongue seat 23 of the preceding preferred embodiment of the wheel 101 illustrated with reference to FIG. 10.

Similarly, each of the portions 26', 27' of the protrusion 22' preferably has a length LP't measured along the circumferential direction that is entirely analogous to that LPs of the portions 26, 27 of the protrusion 22 of the preceding preferred embodiment of the wheel 101 illustrated with reference to FIG. 10.

Also in this further preferred embodiment, therefore, each of the portions 28', 29' of the tongue seat 23' preferably has a length LP's measured along the circumferential direction greater than the length LP't measured along the circumferential direction of the corresponding portions 26', 27' of the protrusion 22', so as to achieve the aforementioned advantageous technical effect of facilitating the mounting operations of the tyre 1 onto the corresponding mounting rim 2 without significantly modifying the coupling characteristics along the circumferential direction between the tyre 1 and the rim 2.

Also this multiple portion configuration of the substantially tongue-shaped protrusion 22' and of the corresponding housing seat 23' therefore achieves the same additional advantageous technical effects described above with reference to the preceding preferred embodiment illustrated in FIG. 10.

Also within the framework of this further preferred embodiment, the aforementioned advantageous technical effects may be achieved both when the portions 26', 27' of the substantially tongue-shaped protrusion 22' have a same length LP't, and when such portions have different lengths LP't measured along the circumferential direction. Clearly, this is also true for the corresponding portions 28', 29' of the housing seat 23' of the protrusion 22'.

The Applicant has found that the preferred configurations of the wheel 101, of the tyre 1 and of the rim 2 described above advantageously allow—thanks to the fact that mechanical coupling elements 21 are provided having the aforementioned geometric characteristics and parts in abutting cooperation—not only to effectively counteract the phenomenon of relative movements between the tyre 1 and the rim 2 both along the circumferential and along the axial direction, but also to achieve this technical effect while ensuring the desired air sealing in any use condition of the tyre 1.

Thanks to the particular structure and geometric configuration of the mechanical coupling elements 21, moreover, both the manufacturing operations of the tyre 1 and of the rim 2 and the mutual mounting operations are advantageously facilitated.

The invention claimed is:

1. A wheel for vehicles, comprising a tyre and a rim, wherein the tyre comprises:
    a carcass structure comprising a central crown portion and two sidewalls terminating in a pair of beads, each of said beads being provided with a base capable of being adapted to cooperate in abutting relationship with the rim;
    a belt structure, coaxially associated with the carcass structure; and
    a tread band coaxially extending around the belt structure,
wherein the rim comprises a pair of axially outer flanges extending at least in part along a radial direction and defining respective bead housing seats circumferentially extending at an axially inner position with respect to said flanges, each of said bead housing seats comprising a base portion capable of being adapted to cooperate in abutting relationship with the base of the respective bead;
wherein the base of at least one of said beads and the base portion of the respective bead housing seat are mutually coupled by means of at least one mechanical coupling element arranged at an interface between the base of the bead and said base portion of said bead housing seat;
wherein said at least one mechanical coupling element is provided with parts cooperating in abutting relationship along a circumferential and along a transversal direction and has a length measured along the circumferential direction that is greater than its width measured along an axial direction;
said length measured along the circumferential direction being less than a circumference of the tyre measured at the base of said at least one bead and said width measured along the axial direction being less than an axial width of the base of said at least one bead and of the base portion of a respective bead housing seat; and
wherein at least one mark is arranged on said tyre and/or on said rim at said at least one mechanical coupling element.

2. The wheel according to claim 1, comprising n mechanical coupling elements spaced apart from each other along the circumferential direction for coupling together the base of said at least one bead and the base portion of a respective bead housing seat, wherein n is an integer between 2 and 72.

3. The wheel according to claim 2, wherein said n mechanical coupling elements have mid-sections spaced apart from each other along the circumferential direction according to a pitch equal to $2\pi Rt/n$, wherein Rt is a radius of the tyre measured at the base of said at least one bead.

4. The wheel according to claim 2, comprising two mechanical coupling elements for coupling together the base of said at least one bead and the base portion of a respective bead housing seat, said mechanical coupling elements being arranged on diametrically opposite parts of said wheel.

5. The wheel according to claim 3, comprising three mechanical coupling elements for coupling together the base of said at least one bead and the base portion of a respective bead housing seat, the mid-sections of said mechanical coupling elements being spaced apart from each other along the circumferential direction according to a pitch equal to about $2\pi Rt/3$, wherein Rt is the radius of the tyre measured at the base of said at least one bead.

6. The wheel according to claim 3, wherein the number of mechanical coupling elements is equal to 8, 9 or 12.

7. The wheel according to claim 1, wherein said at least one mechanical coupling element has an aspect ratio, defined as a ratio between a length of the mechanical coupling element measured along a circumferential direction and a width of said element measured along an axial direction, greater than or equal to 2.

8. The wheel according to claim 7, wherein said at least one mechanical coupling element has an aspect ratio between 2 and 100.

9. The wheel according to claim 1, wherein said at least one mechanical coupling element has a length measured along a circumferential direction between 1% and 99% of the length of a circumference of the tyre measured at a base of said at least one bead.

10. The wheel according to claim 9, wherein the length measured along the circumferential direction of said at least one mechanical coupling element is between 2% and 8% of the length of the circumference of the tyre measured at the base of said at least one bead.

11. The wheel according to claim 1, wherein said at least one mechanical coupling element has a width measured along an axial direction between 10% and 80% of an axial width of a base of said at least one bead.

12. The wheel according to claim 11, wherein the width measured along the axial direction of said at least one mechanical coupling element is between 25% and 75% of the axial width of the base of said at least one bead.

13. The wheel according to claim 11, wherein said at least one mechanical coupling element has a width measured along the axial direction between ½ and ¾ of the axial width of the base of said at least one bead.

14. The wheel according to claim 1, wherein said at least one mechanical coupling element comprises at least one substantially tongue-shaped protrusion and at least one tongue seat capable of being adapted to house said protrusion.

15. The wheel according to claim 14, wherein said substantially tongue-shaped protrusion and said tongue seat have a substantially mating shape.

16. The wheel according to claim 14, wherein said at least one tongue seat has a length measured along a circumferential direction equal to or greater than a length measured along a circumferential direction of said at least one substantially tongue-shaped protrusion.

17. The wheel according to claim 14, wherein said at least one tongue seat has a length measured along a circumferential direction between 1% and 99% of a length of a circumference of the tyre measured at a base of said at least one bead.

18. The wheel according to claim 17, wherein the length measured along the circumferential direction of said at least one tongue seat is between 4% and 80% of the length of the circumference of the tyre measured at the base of said at least one bead.

19. The wheel according to claim 14, wherein said at least one substantially tongue-shaped protrusion has a length measured along a circumferential direction between 1% and 99% of a length of a circumference of the tyre measured at a base of said at least one bead.

20. The wheel according to claim 19, wherein the length measured along the circumferential direction of said at least one substantially tongue-shaped protrusion is between 4% and 80% of the length of the circumference of the tyre measured at the base of said at least one bead.

21. The wheel according to claim 14, wherein said at least one substantially tongue-shaped protrusion comprises a plurality of portions spaced apart from each other along a circumferential direction and wherein said at least one tongue seat comprises a corresponding plurality of portions spaced apart from each other along the circumferential direction and capable of being adapted to house a respective portion of said at least one substantially tongue-shaped protrusion.

22. The wheel according to claim 21, wherein each portion of said at least one substantially tongue-shaped protrusion has a length measured along the circumferential direction between 1% and 49% of a length of a circumference of the tyre measured at the base of said at least one bead.

23. The wheel according to claim 22, wherein a length measured along a circumferential direction of each portion of said at least one substantially tongue-shaped protrusion between 2% and 40% of the length of the circumference of the tyre measured at the base of said at least one bead.

24. The wheel according to claim 21, wherein each portion of said at least one tongue seat has a length measured along the circumferential direction between 1% and 49% of the length of the circumference of the tyre measured at the base of said at least one bead.

25. The wheel according to claim 24, wherein the length measured along the circumferential direction of each portion of said at least one tongue seat is between 2% and 40% of the length of the circumference of the tyre measured at the base of said at least one bead.

26. The wheel according to claim 14, wherein said at least one tongue seat has a width measured along an axial direction greater than or equal to a width measured along an axial direction of said at least one substantially tongue-shaped protrusion.

27. The wheel according to claim 14, wherein said at least one tongue seat has a width measured along an axial direction between 10% and 80% of an axial width of the base of said at least one bead.

28. The wheel according to claim 27, wherein the width measured along the axial direction of said at least one tongue seat is between 25% and 75% of the axial width of the base of said at least one bead.

29. The wheel according to claim 14, wherein said at least one substantially tongue-shaped protrusion has a width measured along an axial direction between 10% and 80% of an axial width of the base of said at least one bead.

30. The wheel according to claim 29, wherein the width measured along the axial direction of said at least one substantially tongue-shaped protrusion is between 25% and 75% of the axial width of the base of said at least one bead.

31. The wheel according to claim 14, wherein said at least one substantially tongue-shaped protrusion radially extends from the base portion of a bead housing seat defined in said rim and wherein said at least one tongue seat capable of being adapted to house said at least one protrusion is radially formed in the base of said at least one bead of the tyre.

32. The wheel according to claim 14, wherein said at least one substantially tongue-shaped protrusion radially extends from the base of said one bead of the tyre, and wherein said at least one tongue seat is capable of being adapted to house said at least one protrusion is radially formed in the base portion of the bead housing seat defined in the rim.

33. The wheel according to claim 14, wherein said at least one substantially tongue-shaped protrusion has a height measured along a radial direction equal to or greater than a depth measured along a radial direction of said at least one tongue seat.

34. The wheel according to claim 14, wherein said, at least one substantially tongue-shaped protrusion has a height measured along a radial direction between 1 mm and 2.5 mm.

35. The wheel according to claim 34, wherein the height measured along the radial direction of said at least one substantially tongue-shaped protrusion is between 1.5 mm and 2 mm.

36. The wheel according to claim 14, wherein said at least one tongue seat has a depth measured along the radial direction between 0.9 mm and 2.4 mm.

37. The wheel according to claim 36, wherein the depth measured along the radial direction of said at least one tongue seat is between 1.4 mm and 1.9 mm.

38. The wheel according to claim 31, wherein said at least one substantially tongue-shaped protrusion is integral with said rim.

39. The wheel according to claim 31, wherein said at least one substantially tongue-shaped protrusion is integral with said at least one bead of the tyre.

40. The wheel according to claim 1, wherein said at least one mechanical coupling element is arranged substantially astride at least one build-up line of elastomeric material radially extending in said tyre.

41. The wheel according to claim 1, wherein said at least one mechanical coupling element is arranged substantially astride a circumferential centre line of the base of the bead or of the base portion of a corresponding bead housing seat.

42. The wheel according to claim 1, wherein said at least one mechanical coupling element is entirely or partly arranged at an axially inner or at an axially outer side with respect to a circumferential centre line of the base of the bead or of the base portion of a corresponding bead housing seat.

43. The wheel according to claim 1, wherein said at least one mechanical coupling element is arranged at the interface between the base of the bead located at an outer wheel side and the base portion of a respective bead housing seat of the rim located at an outer wheel side.

44. The wheel according to claim 1, wherein said at least one mechanical coupling element is arranged at the interface between the base of both the beads of the tyre and the base portion of respective bead housing seats.

45. The wheel according to claim 1, wherein said at least one mark is arranged on the tyre and/or on the rim at an outer wheel side thereof.

46. A tyre for vehicles, comprising:
a carcass structure comprising a central crown portion and two sidewalls terminating in a pair of beads, each of said beads being provided with a base capable of being adapted to cooperate in abutting relationship with a mounting rim;
a belt structure coaxially associated with the carcass structure; and
a tread band coaxially extending around the belt structure,
wherein the base of at least one of said beads comprises at least one tongue seat having a length measured along a circumferential direction greater than a width thereof measured along an axial direction,
said length measured along the circumferential direction being less than a circumference of the tyre measured at the base of said at least one bead and said width measured along the axial direction being less than an axial width of the base of said at least one bead, and
wherein at least one mark is arranged on said tyre at said at least one tongue seat.

47. The tyre according to claim 46, comprising n tongue seats spaced apart from each other along the circumferential direction, wherein n is an integer between 2 and 72.

48. The tyre according to claim 47, wherein said n tongue seats have mid-sections spaced apart from each other along the circumferential direction according to a pitch equal to $2\pi Rt/n$, wherein Rt is a radius of the tyre measured at the base of said at least one bead.

49. The tyre according to claim 47, wherein at least one said tongue seat has an aspect ratio defined as a ratio between a length of the tongue seat measured along the circumferential direction and a width of said seat measured along an axial direction, greater than or equal to 2.

50. The tyre according to claim 47, wherein at least one said tongue seat is arranged substantially astride at least one build-up line of elastomeric material radially extending in said tyre.

51. A tyre for vehicles, comprising:
a carcass structure comprising a central crown portion and two sidewalls terminating in a pair of beads, each of said beads being provided with a base capable of being adapted to cooperate in abutting relationship with a mounting rim;
a belt structure coaxially associated with the carcass structure; and
a tread band coaxially extending around the belt structure,
wherein at least one of said beads comprises at least one substantially tongue-shaped protrusion extending from a respective base thereof, said protrusion having a length measured along a circumferential direction greater than a width thereof measured along an axial direction,
said length measured along the circumferential direction being less than a circumference of the tyre measured at the base of said at least one bead and said width measured along the axial direction being less than an axial width of the base of said at least one bead, and
wherein at least one mark is arranged on said tyre at said at least one substantially tongue-shaped protrusion.

52. The tyre according to claim 51, comprising n substantially tongue-shaped protrusions spaced apart from each other along the circumferential direction, wherein n is an integer between 2 and 72.

53. The tyre according to claim 52, wherein said n substantially tongue-shaped protrusions have mid-sections spaced apart from each other along the circumferential direction according to a pitch equal to $2\pi Rt/n$, wherein Rt is a radius of the tyre measured at the base of said at least one bead.

54. The tyre according to claim 52, wherein at least one said substantially tongue-shaped protrusion has an aspect ratio defined as a ratio between the length of the substantially tongue-shaped protrusion measured along the circumferential direction and the width of said protrusion measured along an axial direction, greater than or equal to 2.

55. The tyre according to claim 52, wherein at least one said substantially tongue-shaped protrusion is arranged substantially astride at least one build-up line of elastomeric material radially extending in said tyre.

56. A mounting rim for vehicle tyres, comprising a pair of axially outer flanges extending at least in part along a radial direction and defining respective bead housing seats, said bead housing seats circumferentially extending at an axially inner position with respect to said flanges and comprising a base portion,
wherein at least one of said bead housing seats comprises at least one substantially tongue-shaped protrusion extending from said base portion of the bead housing seat, said protrusion having a length measured along a circumferential direction greater than a width thereof measured along an axial direction,
said length measured along the circumferential direction being less than a circumference of the rim measured at the base portion of said at least one bead housing seat and said width measured along the axial direction being less than an axial width of the base portion of said at least one bead housing seat, and
wherein at least one mark is arranged on said rim at said at least one substantially tongue-shaped protrusion.

57. The mounting rim according to claim 56, comprising n substantially tongue-shaped protrusions spaced apart from each other along the circumferential direction, wherein n is an integer between 2 and 72.

58. The mounting rim according to claim 57, wherein said n substantially tongue-shaped protrusions have mid-sections spaced apart from each other along the circumferential direction according to a pitch equal to $2\pi Rc/n$, wherein Rc is a radius of the rim measured at said bead housing seat.

59. The mounting rim according to claim 56, wherein said at least one substantially tongue-shaped protrusion has an aspect ratio (Lt/Wt), defined as a ratio between a length of the substantially tongue-shaped protrusion measured along the circumferential direction and a width of said protrusion measured along an axial direction, greater than or equal to 2.

60. A mounting rim for vehicle tyres, comprising a pair of axially outer flanges extending at least in part along a radial direction and defining respective bead housing seats, said bead housing seats circumferentially extending at an axially inner position with respect to said flanges and comprising a base portion,
wherein at least one of said bead housing seats comprises at least one tongue seat having a length measured along a circumferential direction greater than a width thereof measured along an axial direction,
said length measured along the circumferential direction being less than a circumference of the rim measured at the base portion of said at least one bead housing seat and said width measured along the axial direction being less than an axial width of the base portion of said at least one bead housing seat, and
wherein at least one mark is arranged on said rim at said at least one tongue seat.

61. The mounting rim according to claim 60, comprising n tongue seats spaced apart from each other along the circumferential direction, wherein n is an integer between 2 and 72.

62. The mounting rim according to claim 60, wherein said n tongue seats have mid-sections spaced apart from each other along the circumferential direction according to a pitch equal to $2\pi Rc/n$, wherein Rc is a radius of the rim measured at said bead housing seat.

63. The mounting rim according to claim 60, wherein said at least one tongue seat has an aspect ratio defined as a ratio between a length of the tongue seat measured along the circumferential direction and a width of said seat measured along the axial direction, greater than or equal to 2.

* * * * *